(12) United States Patent
Perisetty

(10) Patent No.: US 7,978,450 B1
(45) Date of Patent: Jul. 12, 2011

(54) ELECTROSTATIC DISCHARGE PROTECTION CIRCUITRY

(75) Inventor: Srinivas Perisetty, Santa Clara, CA (US)

(73) Assignee: Altera Corporation, San Jose, CA (US)

( * ) Notice: Subject to any disclaimer, the term of this patent is extended or adjusted under 35 U.S.C. 154(b) by 433 days.

(21) Appl. No.: 12/052,718

(22) Filed: Mar. 20, 2008

(51) Int. Cl.
- H02H 9/00 (2006.01)
- H01C 7/12 (2006.01)
- H02H 1/00 (2006.01)
- H02H 1/04 (2006.01)
- H02H 3/22 (2006.01)
- H02H 9/06 (2006.01)

(52) U.S. Cl. .......... 361/56; 361/118

(58) Field of Classification Search .......... 361/56
See application file for complete search history.

(56) References Cited

U.S. PATENT DOCUMENTS

| | | | |
|---|---|---|---|
| 5,990,723 A | 11/1999 | Tanase | |
| 6,034,552 A | 3/2000 | Chang et al. | |
| 6,169,312 B1 | 1/2001 | Hiraga | |
| 6,249,410 B1 | 6/2001 | Ker et al. | |
| 6,327,125 B1 | 12/2001 | Coclaser et al. | |
| 6,329,863 B1 | 12/2001 | Lee et al. | |
| 6,430,016 B1 | 8/2002 | Marr | |
| 6,624,992 B1 | 9/2003 | Aparin | |
| 6,724,592 B1 * | 4/2004 | Tong et al. | 361/56 |
| 7,271,989 B2 | 9/2007 | Huang et al. | |
| 7,683,607 B2 * | 3/2010 | Cheng et al. | 324/158.1 |
| 2007/0081282 A1 * | 4/2007 | Li et al. | 361/56 |
| 2007/0223158 A1 * | 9/2007 | Ma et al. | 361/56 |
| 2008/0316660 A1 * | 12/2008 | Huang et al. | 361/56 |

* cited by examiner

Primary Examiner — Dharti H Patel
(74) Attorney, Agent, or Firm — Treyz Law Group; G. Victor Treyz; Nancy Y. Ru

(57) ABSTRACT

An integrated circuit has pins to which electrostatic discharge voltages may be delivered during electrostatic discharge events. Circuitry in the integrated circuit can be protected from damage by the electrostatic discharge voltages by electrostatic discharge protection circuitry. The electrostatic discharge protection circuitry may include one or more diodes that are connected between a given pin and ground to discharge negative electrostatic discharge voltages. Positive electrostatic discharge voltages may be discharged using a transistor that is connected between the pin and ground and that breaks down at a breakdown voltage. A voltage blocking circuit such as a circuit based on a voltage blocking transistor may be used to prevent damaging electrostatic discharge voltages from reaching sensitive circuitry. Pull down circuitry may be used to help ensure that the circuitry is protected from damage during electrostatic discharge events.

18 Claims, 8 Drawing Sheets

US 7,978,450 B1

ELECTROSTATIC DISCHARGE PROTECTION CIRCUITRY

BACKGROUND

This invention relates to electrostatic discharge protection, and more particularly, to circuitry for protecting sensitive circuits from damage due to electrostatic discharge events.

Integrated circuits are often exposed to potentially damaging electrostatic charges. For example, a wafer of integrated circuits may be exposed to electric charges during fabrication. Such charges may arise from the use of plasma etching techniques or other processes that produce charged particles. As another example, a packaged integrated circuit may be exposed to electrostatic charges when a worker inadvertently touches exposed pins on the circuit's package or when the package becomes charged electrostatically due to movement of the package in a tray.

These electrostatic charges can damage sensitive circuitry. For example, transistors and other electrical devices on an integrated circuit can be damaged when exposed to excessive currents.

To reduce the impact of electrostatic charges on sensitive circuitry, integrated circuits may be provided with electrostatic discharge protection circuitry. Conventional electrostatic discharge protection circuitry may not, however, be compatible with the type of sensitive circuitry that is being protected or may not protect circuits adequately against certain types of electrostatic events.

It would therefore be desirable to provide improved circuitry for protecting integrated circuits against the harmful effects of electrostatic discharge.

SUMMARY

In accordance with the present invention, electrostatic discharge protection circuitry is provided to prevent damage to integrated circuits during electrostatic discharge events.

During a typical electrostatic discharge event, positive and negative electrostatic discharge voltages are applied to one or more input-output pins on an integrated circuit. If internal circuitry that is coupled to the input-output pins is not properly protected, the circuitry may be damaged by these voltages.

Protection from electrostatic discharge events may be provided using a voltage blocking circuit. The voltage blocking circuit may be based on a voltage blocking transistor that is coupled between a sensitive internal circuit and a pin. The transistor may have a gate that is connected to a power supply terminal. Parasitic capacitances associated with the power supply terminal help to hold the gate of the transistor at ground during an electrostatic discharge event, thereby helping to ensure that electrostatic discharge voltages are blocked from the sensitive internal circuit.

Additional electrostatic discharge protection may be provided using pull down circuitry. The pull down circuitry may help to ensure that the voltage blocking circuit remains off during electrostatic discharge events. The pull down circuitry may also help hold an output that is associated with the internal circuitry at ground to prevent electrostatic discharge damage. One or more diodes may be connected in series between the pin and ground to discharge negative electrostatic discharge voltages. Positive electrostatic discharge voltages may be discharged using a transistor that is connected between the pin and ground. During electrostatic discharge events, this transistor may break down to discharge the electrostatic discharge voltage on the pin.

Further features of the invention, its nature and various advantages will be more apparent from the accompanying drawings and the following detailed description.

DETAILED DESCRIPTION

Integrated circuits are often exposed to electrostatic charges. For example, if a person inadvertently touches the pins of an integrated circuit, the devices within the integrated circuit may be exposed to electrostatic charge through the person's skin. Electrostatic charges may also develop as an integrated circuit is processed or during handling.

The large currents that develop during an electrostatic discharge event may damage circuitry on the integrated circuit.

The present invention relates to ways to protect integrated circuits from the undesirable effects of electrostatic discharge. In particular, the invention relates to circuitry for preventing sensitive circuitry and devices from being damaged due to exposure to undesirably high voltages and currents. The invention may be used to protect circuits formed from any suitable integrated circuit components such as transistors, diodes, resistors, capacitors, etc.

Figure 1:
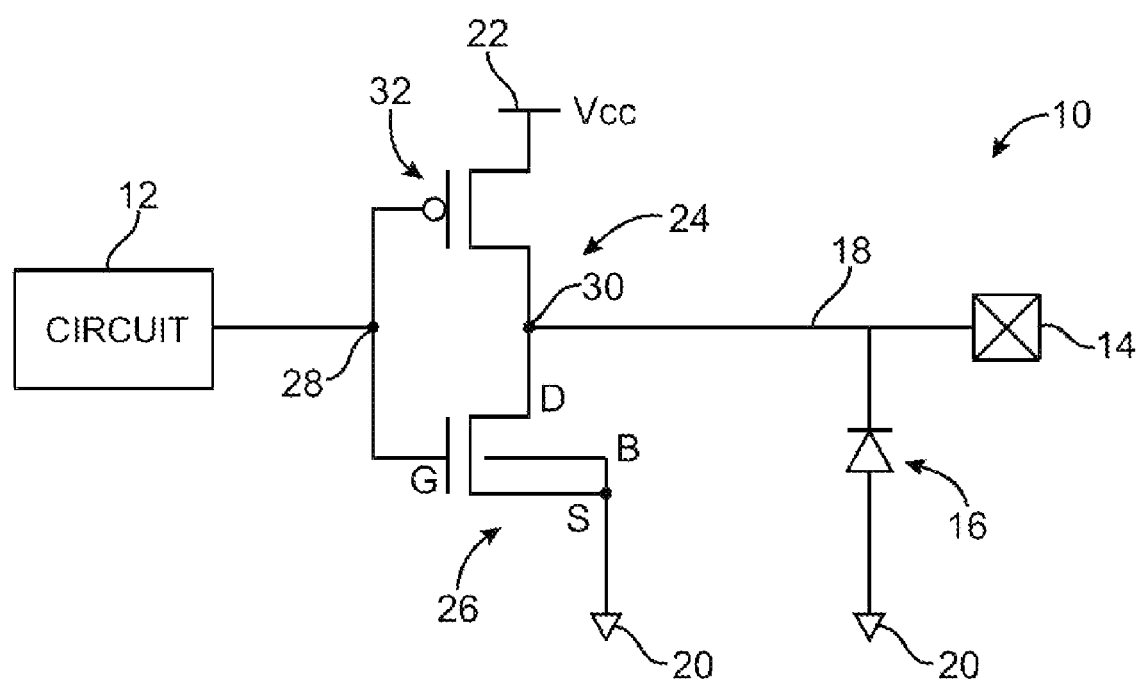
FIG. 1 is a circuit diagram of a conventional electrostatic discharge protection circuit formed from a transistor in an integrated circuit output driver and a diode.

Conventional electrostatic discharge (ESD) protection circuitry 10 is shown in FIG. 1. In the example of FIG. 1, circuit 12 represents sensitive internal circuitry on an integrated circuit. Inverter 24 serves as an output driver for circuit 12. Inverter 24 may have a p-channel metal-oxide-semiconductor (PMOS) transistor such as transistor 32 and an n-channel metal-oxide-semiconductor (NMOS) transistor such as transistor 26. Inverter 24 is powered by a positive power supply voltage received at positive power supply terminal 22 and a ground voltage at ground terminal 20. During operation, circuit 12 may supply output signals to node 28. Inverter 24 inverts the signals on node 28 and supplies corresponding inverted signals on node 30.

The signals on node 30 are conveyed via path 18 to input-output pin 14 (also sometimes referred to as pad 14). Diode 16 is coupled between path 18 and ground 20. During an electrostatic discharge event, the voltage on pin 14 may rise or fall to potentially dangerous levels. Potentially dangerous positive voltages on pin 14 may be handled by the voltage breakdown characteristics of transistor 36. Potentially dangerous negative voltages on pin 14 may be handled by diode 16.

If the voltage on pin 14 becomes negative during an electrostatic discharge event, the voltage on line 18 may drop to a value that is 0.6-0.7 volts (one diode turn-on voltage) below the ground voltage (0 volts) at ground terminal 20. In this type of negative voltage electrostatic discharge scenario, diode 16 will turn be turned on and will discharge the current associated with the electrostatic discharge event. At voltages that are more than about 0.7 volts below ground, diode 16 is strongly turned on. Diode 16 therefore effectively clamps the voltage on line 18 at one diode turn-on voltage below ground. By preventing the voltage on line 18 from becoming too low during an electrostatic discharge event, diode 16 helps to protect circuit 12 from negative electrostatic discharge voltages.

Figure 2:
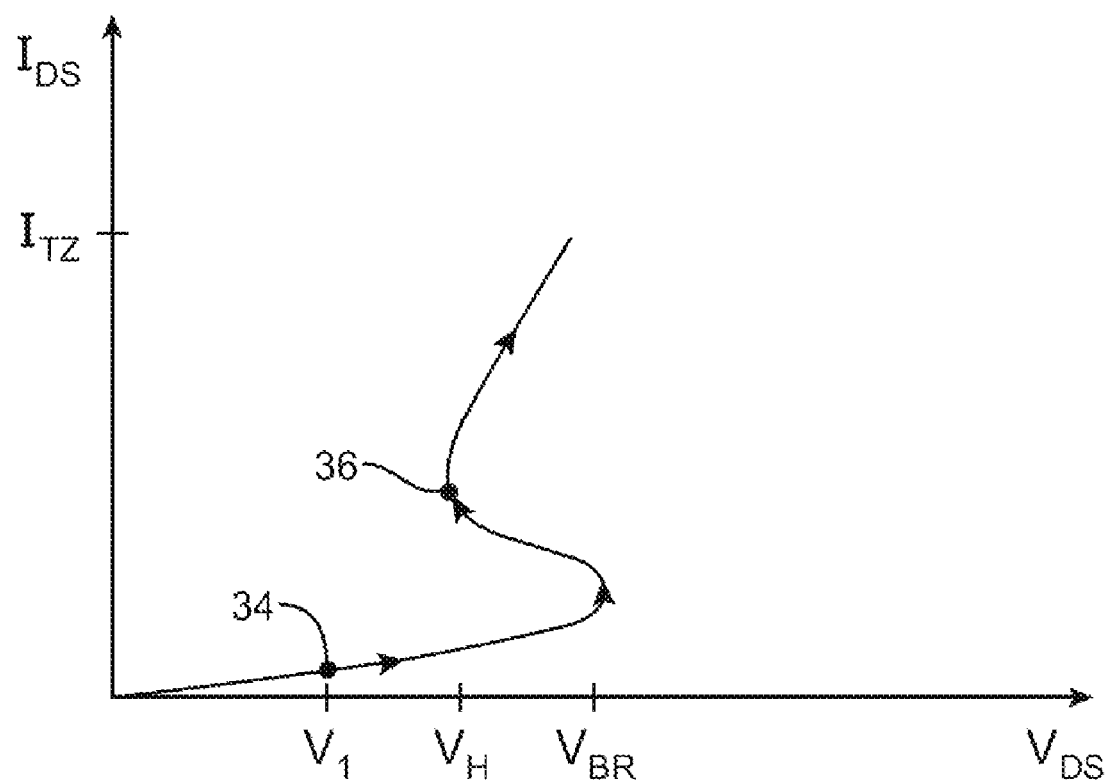
FIG. 2 is a graph of the breakdown behavior associated with a metal-oxide-semiconductor transistor used in an electrostatic discharge protection circuit.

FIG. 2 shows a current versus voltage plot for an n-channel transistor such as transistor 26 of FIG. 1. In the graph of FIG. 2, the drain-source current Ids of the transistor is plotted as a function of drain-source voltage Vds. As shown in FIG. 2, when the drain-source voltage Vds is low (e.g., at a voltage V1 associated with operating point 34), the transistor operates normally. If the voltage Vds exceeds the breakdown voltage Vbr, carriers are injected into the transistor's body terminal B and the transistor experiences breakdown. In this situation, the current Ids continues to rise, but the voltage settles back towards hold voltage Vh (see, e.g., operating point 36 in FIG. 2). Further voltage increases will result in larger values of current Ids, provided that the transistor does not exceed maximum allowable current It2.

The ability of transistor 26 to discharge current when positive values of Vds are encountered allows transistor 26 to protect circuit 12 from damage due to positive voltages encountered during electrostatic discharge events. If the voltage on pin 14 becomes positive during an electrostatic discharge event, the voltage on line 18 may rise to a value of Vbr above the ground voltage at terminal 20. In this type of positive voltage electrostatic discharge scenario, transistor 26 will break down as described in connection with FIG. 2 and will discharge the current and voltage associated with the electrostatic discharge event.

The electrostatic discharge protection circuitry of FIG. 1 may often be satisfactory, but relies on the presence of output inverter 24 and is not applicable to situations in which the voltages of the data signals on line 18 are sometimes negative. It is also necessary to form transistors such as transistor 26 using design rules that are appropriate for electrostatic discharge scenarios. Transistors such as transistor 26 may need to be fabricated with multiple fingers to accommodate the anticipated magnitude of the electrostatic discharge current. Resistors may need to be added to these transistor fingers so that as current builds in a given one of the transistor fingers the resulting rise in voltage drop across the resistor of that finger will redirect current towards other fingers. It may also be necessary to construct transistor 26 using a special electrostatic discharge ion implantation step to lower the breakdown voltage Vbr to a desired level.

Figure 3:
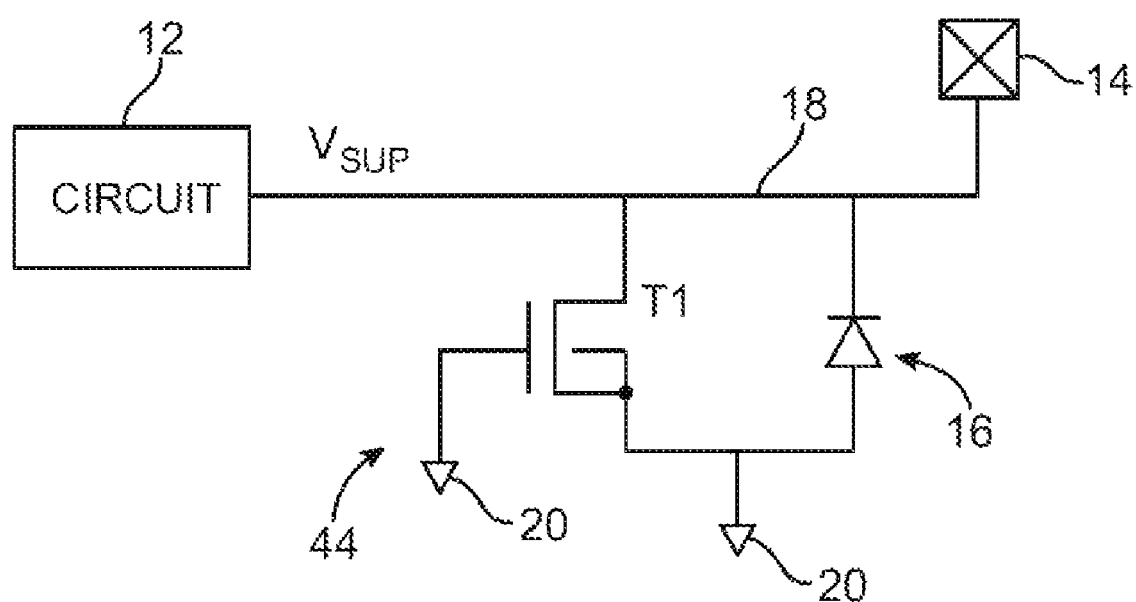
FIG. 3 is a circuit diagram of a conventional electrostatic discharge protection circuit formed from a metal-oxide-semiconductor transistor and a diode.

Another conventional electrostatic discharge protection circuit is shown in FIG. 3. Electrostatic discharge protection circuitry 44 of the type shown in FIG. 3 has been used in arrangements in which a power supply pin 14 provides a power supply signal Vsup to a circuit 12. As with circuit 10 of FIG. 1, diode 16 may be used to handle negative electrostatic discharge voltages. Transistor T1 is used to handle positive electrostatic discharge voltages. As described in connection with the graph of FIG. 2, transistor T1 will break down when the voltage on path 18 exceeds breakdown voltage Vbr. Electrostatic discharge protection circuitry 44 of FIG. 3 may be satisfactory in some situations, but because the breakdown voltage Vbr is dependent on gate oxide thickness, circuitry 44 can become unreliable in integrated circuits with thin gate oxides, particularly when exposed to high electrostatic discharge voltages.

Figure 4:
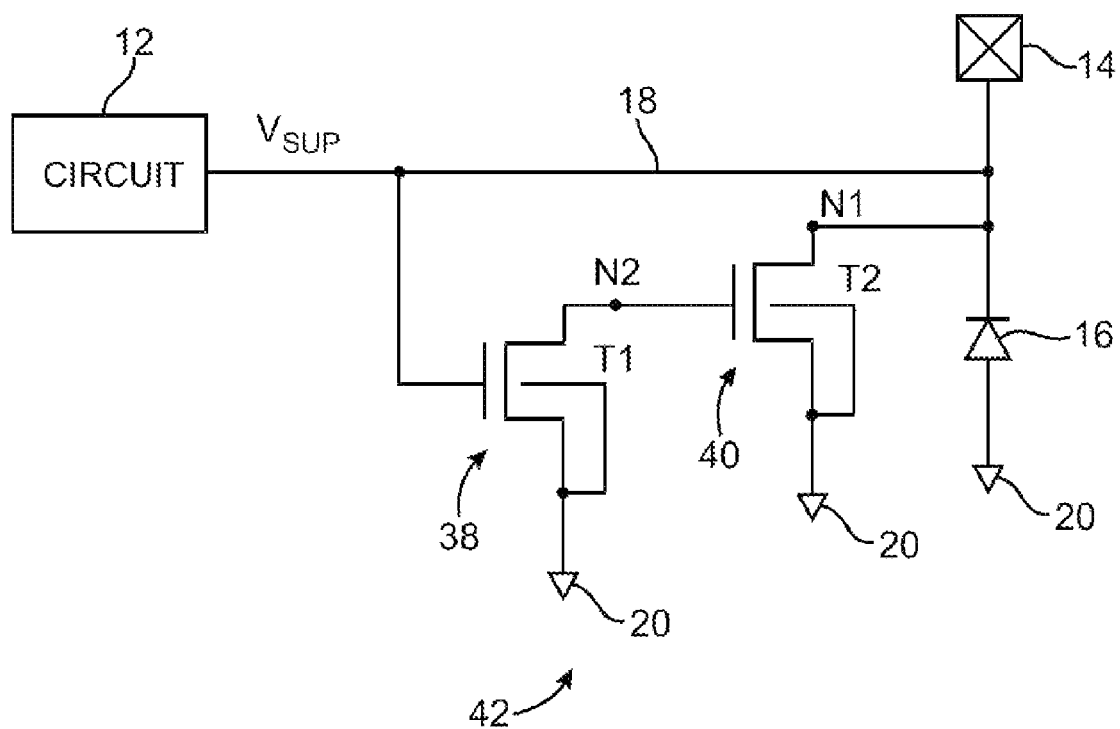
FIG. 4 is a circuit diagram of a conventional electrostatic discharge protection circuit formed from two metal-oxide-semiconductor transistors and a diode.

An alternative to the conventional electrostatic discharge protection circuit of FIG. 3 is shown in FIG. 4. Electrostatic discharge protection circuitry 42 of the type shown in FIG. 4 has also been used in arrangements in which a power supply pin 14 provides a power supply signal Vsup to a circuit 12. As with circuit 44 of FIG. 3, diode 16 of circuitry 42 may be used to handle negative electrostatic discharge voltages. Capacitive coupling from node N1 to N2 causes the voltage on node N2 of circuitry 42 to track positive electrostatic discharge voltages on node N1, turning on transistor T2 to discharge pin 14. Subsequently, transistor T1 will break down according to the transistor breakdown behavior of the graph of FIG. 2. The electrostatic discharge protection circuitry of FIG. 4 may be more reliable than the circuit of FIG. 3, but is only applicable to situations in which the nominal voltages for the signals on path 18 are non-negative.

Figure 5:
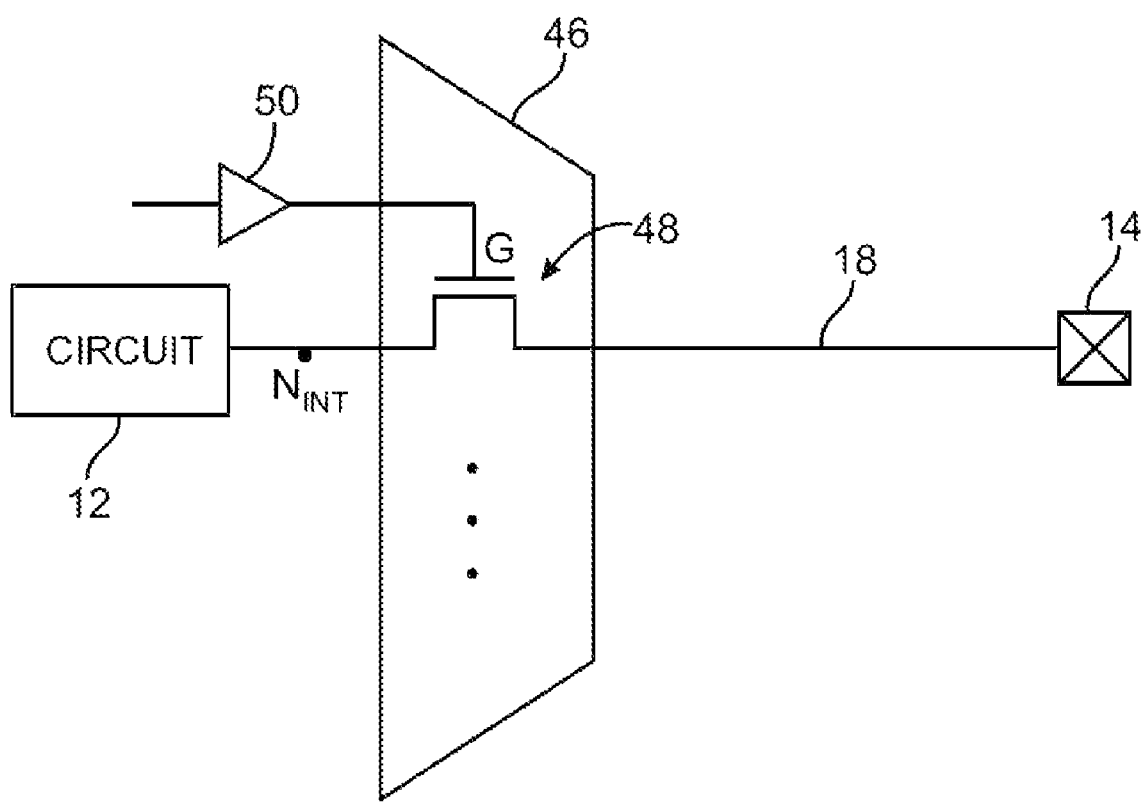
FIG. 5 is a circuit diagram of a portion of an integrated circuit illustrating how multiplexer circuitry may contain pass transistors that can allow harmful signals to damage internal circuitry during an electrostatic discharge event.

FIG. 5 shows a circuit diagram of circuitry on an integrated circuit in which the signal voltages on path 18 are not always nominally non-negative. This type of scenario may be encountered when a multiplexer such as multiplexer 46 is used to selectively route signals from circuit 12 to path 18. Multiplexer 46 may have multiple pass transistors such as transistor 48. Pass transistors in multiplexer 46 may be connected in parallel between respective circuit nodes such as node Nint at the inputs to multiplexer 46 and path 18 at the output of the multiplexer. The gate of each pass transistor 48 may be connected to a different respective control line (e.g., a control line connected to a driver such as driver 50).

When an electrostatic discharge event raises the voltage on pad 14, the voltage on line 18 rises accordingly. Due to capacitive coupling across the gate of transistor 48, the voltage on gate G tends to track the voltage on path 18. As a result, transistor 48 may turn on, allowing the potentially dangerous high voltage on pad 14 to pass to sensitive circuit 12. This may damage circuit 12.

Figure 6:
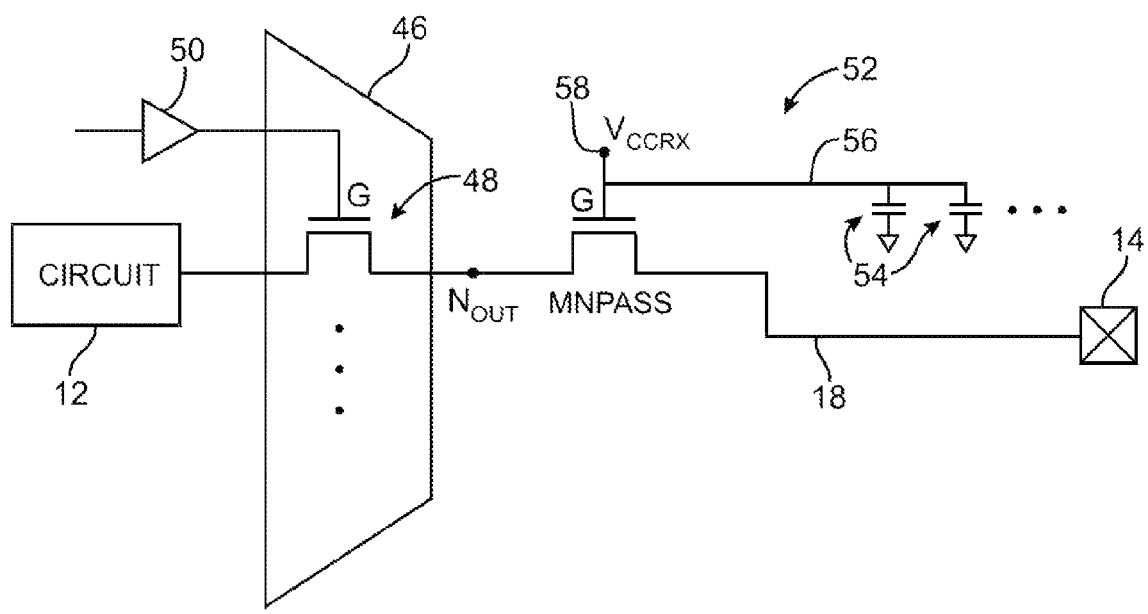
FIG. 6 is a circuit diagram of a portion of an integrated circuit illustrating how circuitry that is connected to multiplexer circuitry that contains pass transistors can be protected from harm during electrostatic discharge events by a transistor with a capacitively loaded gate in accordance with an embodiment of the present invention.

To address the potential for damage in circuit 12 when circuitry of the type shown in FIG. 5 is exposed to positive electrostatic discharge voltages, voltage blocking circuitry may be interposed in path 18 between multiplexer 46 and pad 14. This type of arrangement is shown in FIG. 6. In the example of FIG. 6, blocking circuitry 52 includes blocking transistor MNPASS. Transistor MNPASS may be, for example, an NMOS transistor. The gate G of transistor MNPASS may be supplied with a power supply voltage Vccrx or other suitable control signal during normal operation. The value of Vccrx may be, for example, 2.5 volts. This value may be elevated with respect to the power supply voltage (e.g., a Vcc voltage of 1.0 volts) that is used in powering core logic on the integrated circuit that contains circuit 12. Use of a Vccrx voltage that is elevated with respect to Vcc may help to turn transistor MNPASS on during normal operation sufficiently to allow data signals with maximum voltages of Vcc to pass to path 18. Pass transistors 48 and transistor MNPASS may also allow negative signals to pass from circuit 12 to pad 14 during normal operation.

As shown in FIG. 6, power supply voltage Vccrx may be supplied at positive power supply voltage terminal 58. There may be numerous other circuit components that are coupled to terminal 58 in addition to transistor MNPASS. These components, which may be, for example, core logic transistors, may give rise to a parasitic capacitance that is coupled to terminal 58. Noise reducing capacitors may also be coupled to terminal 58. As a result, there is typically a capacitance (shown schematically in FIG. 6 as capacitance 54) that loads terminal 58 and the gate G of transistor MNPASS.

When the integrated circuit is not powered, the internal voltages in the integrated circuit may drift towards ground (e.g., 0 volts). In this type of situation, the gate G of transistor MNPASS will be about 0 volts. When exposed to an electrostatic discharge voltage, the voltage on pad 14 may rise. Due to the capacitive loading (represented by capacitance 54 in FIG. 6) on gate G, the voltage on gate G of transistor MNPASS will not change instantaneously (as occurred with gate G of transistor 48 of FIG. 5 due to capacitive coupling). This helps hold voltage blocking transistor MNPASS off as the voltage on pad 14 rises. With transistor MNPASS held off, the voltage on node Nout will be isolated from the electrostatic discharge voltage on pad 14. If desired, multiple additional pass transistors may be used in place of transistor MNPASS or other blocking circuitry may be used to prevent circuitry such as the output of multiplexer 46 and circuit 12 from being exposed to electrostatic discharge voltages. The example of FIG. 6 in which transistor MNPASS is used to serve as blocking circuitry 52 for the electrostatic discharge protection circuitry is merely illustrative.

Figure 7:
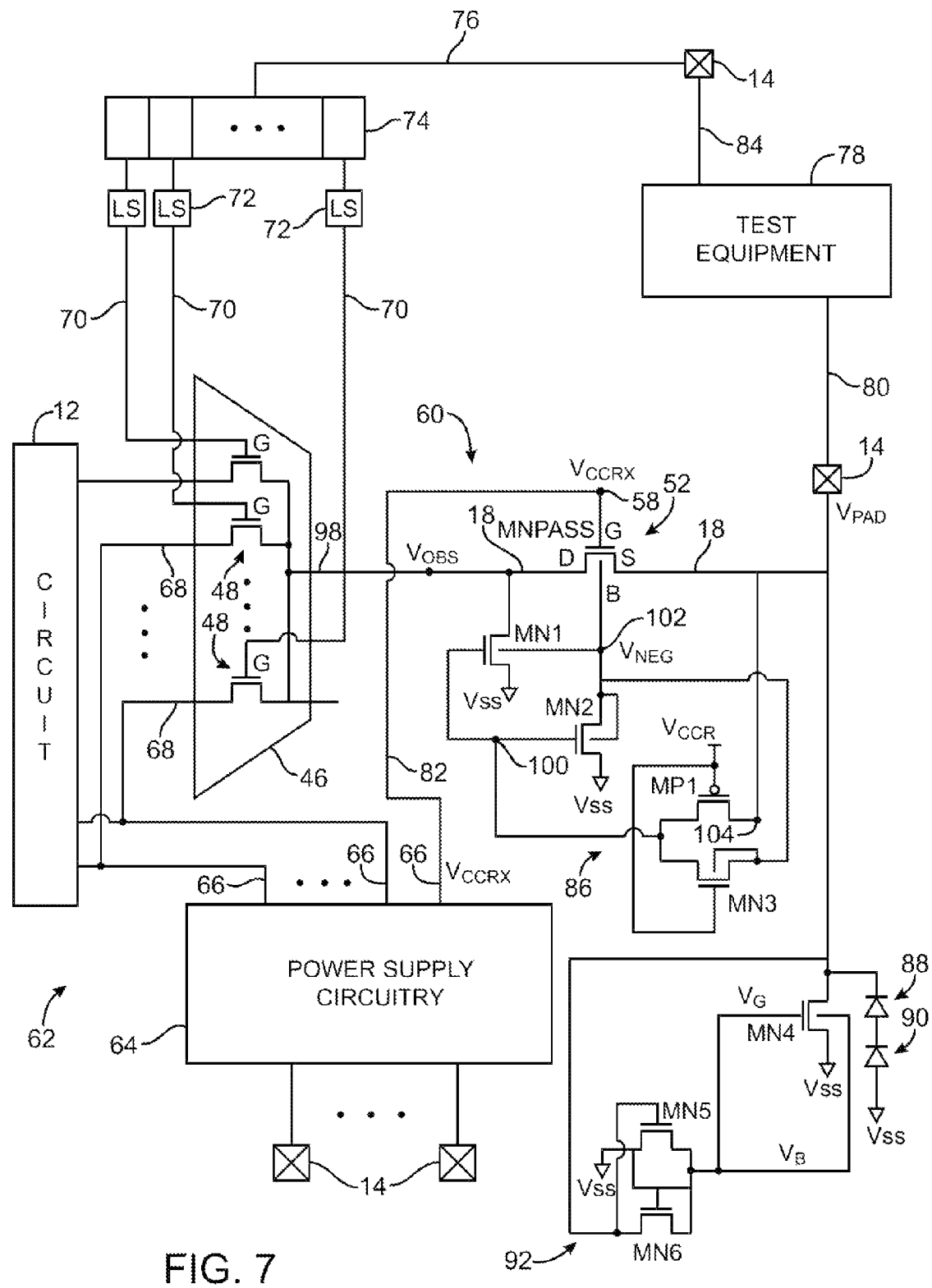
FIG. 7 is a more detailed circuit diagram illustrating how circuitry that is connected to multiplexer circuitry that contains pass transistors can be protected from harm during electrostatic discharge events by a transistor with a capacitively loaded gate in accordance with an embodiment of the present invention.

FIG. 7 shows an illustrative embodiment of an integrated circuit 62 with electrostatic discharge protection circuitry 60 in accordance with an embodiment of the present invention. As shown in FIG. 7, integrated circuit 62 may have pins (pads) 14. In normal operation in a system, pins 14 may be connected to traces on a printed circuit board. During normal operation in a test environment, test equipment 78 may be connected to pads 14 using one or more conductive paths. In the example of FIG. 7, test equipment 78 is coupled to pads 14 using control path 84 and monitoring path 80. Test equipment 78 may be based on any suitable computing equipment. For example, test equipment 78 may be implemented using one or more computers. During a test, test equipment 78 may be used to supply control signals to integrated circuit 62 via path 84. Resulting test signals may be monitored by test equipment 78 using path 80.

Integrated circuit 62 may have power supply circuitry 64. Power supply circuitry 64 may receive power supply voltages at pins 14. For example, power supply circuitry 64 may receive a ground voltage, one or more positive power supply voltages, and one or more optional negative power supply voltages using pins 14. Power supply circuitry 64 may, for example, receive a positive power supply voltage Vcc (e.g., a 1.0 volt power supply voltage), an elevated power supply voltage Vccrx (e.g., a 2.5 volt power supply voltage), and a ground voltage. Circuitry in power supply circuitry 64 (e.g., charge pump circuitry and voltage regulator circuitry) may be used to generate positive, negative, and ground power supply voltages on power supply lines such as lines 66.

It may be desirable to monitor the voltages on internal nodes of integrated circuit 62 during testing. For example, it may be desirable to monitor the power supply voltages on lines 66 during testing. The ability to gather measurements on internal signals in device 62 during testing allows accurate test results to be obtained by test equipment 78.

As shown in FIG. 7, the signals on lines 66 may be routed to the inputs 68 of switching circuitry such as multiplexer 46. This switching circuitry may be controlled by control signals on control inputs 70. With one suitable arrangement, control signals from test equipment 78 are routed to test control circuitry via paths 84 and 76. The test control circuitry may include shift register circuitry 74 and level shifting circuitry such as level shifters 72. Level shifters 72 may receive digital signals with one voltage range (e.g., 0 to 1.0 volts) at their inputs and may produce corresponding level-shifted digital signals at their outputs. For example, level shifters 72 may produce signals at their outputs that range from −1.0 to 1.0 volts. If it is desired to monitor nodes that have voltages greater than 1.0 volts, level shifter 72 may produce signals that range from −1.0 to 2.5 volts (as an example).

The control signals from test equipment 78 may be used to direct shift register 74 to produce a walking one pattern or other suitable test pattern at its output. This test signal pattern may be used to selectively enable pass transistors 48 in multiplexer 46. As each pass transistor is enabled, a different input 68 of multiplexer 46 is routed to output 98.

Signal Vobs is the voltage on output 98 (e.g., the voltage to be observed during testing or the voltage of a signal during normal operation of an integrated circuit in a system). This signal may be routed to pad 14 via path 18 and blocking circuit 52 (e.g., transistor MNPASS). The voltage Vpad at pad 14 may be monitored by test equipment 78 over path 80, as the test pattern of control signals on lines 70 controls which voltages are being routed to output 98 by pass transistors 48.

Electrostatic discharge protection circuitry 60 may be used to protect circuits such as multiplexer circuit 46 and circuit 12 from damage during electrostatic discharge events. As described in connection with FIG. 6, blocking circuitry 52 may include an NMOS transistor such as transistor MNPASS. The gate G of transistor MNPASS may be provided with an elevated voltage such as voltage Vccrx during normal operation. Voltage Vccrx may be provided to gate G of transistor MNPASS from power supply circuitry 64 via path 82.

When integrated circuit 62 is not powered (e.g., when integrated circuit 62 is being handled by a person who might inadvertently contact one of pins 14 and create an electrostatic discharge), power supply lines 66 are floating and are at or near ground (e.g., a ground voltage Vss of 0 volts). When Vpad rises due to a positive voltage electrostatic discharge event, the grounded gate G of transistor MNPASS will remain at about 0 volts due to the capacitance (shown as capacitance 54 in FIG. 6) that is loading terminal 58. This will insulate output 98 from the positive electrostatic discharge voltage Vpad on pad 14.

Pull-down circuitry 86 may be used to ensure that transistor MNPASS is not inadvertently turned on during a positive electrostatic discharge event. Pull down circuitry 86 may include a pull-down circuit formed from transistors MN1 and MN2 or other suitable circuitry and a pull-down control circuit formed from transistors MP1 and MN3 or other suitable circuitry. When integrated circuit 62 is powered off and vulnerable to damage from an electrostatic discharge event, node 102 and voltage Vneg are floating. There are parasitic capacitances bridging the drain-to-body and the body-to-source junctions of transistor MNPASS. These parasitic capacitances can lead to capacitive coupling that has the potential to allow Vobs to track Vpad during an electrostatic discharge event, causing damage to circuit 12. Pull down circuitry 86 allows transistors MN1 and MN2 to be turned off during normal operation (i.e., when MNPASS is on to allow voltage Vobs to pass to Vpad for monitoring by test equipment 78). But during a positive voltage electrostatic discharge event, the control circuit formed from transistors MP1 and MN3 turns on transistors MN1 and MN2. This holds Vneg firmly to ground and pulls Vobs to ground, thereby preventing a positive electrostatic discharge voltage Vpad from passing to multiplexer 46.

During normal operation of integrated circuit 62, signal Vneg is held at a suitable negative voltage (e.g., −1.0 volts) and voltage Vccrx is maintained at a suitable positive voltage (e.g., 2.5 volts). In this situation, transistor MP1 is off and transistor MN3 is on. The voltage at node 100 is equal to Vneg, so transistors MN1 and MN2 are turned off. Because transistors MN1 and MN2 are turned off, pull-down circuitry 86 is disabled and does not pull down the voltage Vobs during normal operation. This allows circuit 62 to be used in a system or, in a test environment, allows test equipment 78 to monitor the signal Vobs. Multiplexer 46, which receives test control signals from test equipment 78 via paths 84 and 76 and circuitry 74 and 72, is used to dynamically control which of inputs 68 is routed to output 98, thereby controlling which internal voltage is being monitored by test equipment 78. As measurements are being made, one of the pass transistors 48 is turned on so that signals from its associated input 68 are routed to output 98. Transistor MNPASS is held on by voltage Vccrx on gate G of transistor MNPASS, so voltage Vobs on output 98 passes to path 18 and its associated pin 14 as voltage Vpad.

During a positive electrostatic discharge event when integrated circuit 62 is powered off, voltage Vneg on node 102 is floating at ground (i.e., at a ground voltage Vss of 0 volts). Positive power supply terminal 58 at the gate G of voltage blocking transistor MNPASS is also floating at 0 volts. When voltage Vpad transitions to a positive voltage during the electrostatic discharge event, node 104 goes high. As soon as the voltage at node 104 exceeds the threshold voltage Vt of transistor MP1, transistor MP1 will turn on and the voltage on node 100 will become equal to the voltage on node 104 (i.e., Vpad). With node 100 at Vpad, transistors MN1 and MN2 are turned on, pulling voltages Vneg and Vobs to ground. Because Vobs is pulled to ground, the high electrostatic discharge voltage on pad 14 does not pass to output 98 of multiplexer 46, thereby protecting circuit 12 from damage. (Ground terminals Vss function as ground even when circuit 62 is not installed in a system due to the capacitance associated with the ground terminals of circuit 62.)

Additional electrostatic discharge protection may be provided using electrostatic discharge protection circuitry 92 of electrostatic discharge protection circuitry 60. Diodes 88 and 90 turn on when the voltage Vpad drops below two diode turn-on voltages (about −1.2 to −1.4 in total). The use of two series-connected diodes helps to increase the turn-on threshold for the diode circuitry to a sufficiently high level. During normal operation, the voltage Vpad may sometimes be negative at about −1.0 volts (as an example). Because −1.0 volts is smaller in magnitude than −1.2 volts, diodes 88 and 90 will remain off, allowing the negative signal Vobs to pass to pad 14 (e.g., for observation by test equipment 78). However, during a negative voltage electrostatic discharge event, diodes 88 and 90 will turn on to discharge electrostatic discharge current and voltage.

Transistor MN4, which may be implemented using a thick oxide transistor (e.g., a transistor with a gate oxide thickness of about 25 angstroms), may be used to handle positive voltage electrostatic discharge events. During such events, voltage Vg on the gate of transistor MN4 and voltage Vb on the body of transistor MN4 will be approximately at ground. As described in connection with the graph of FIG. 2, transistor MN4 will break down when exposed to positive electrostatic discharge voltages, thereby protecting circuit 12 from damage.

When signal Vobs is positive during normal operation, transistor MN5 will be on and transistor MN6 will be off. In this situation, voltages Vg and Vb will be maintained at Vss (ground) and transistor MN4 will be off. When signal Vobs is negative during normal operation, transistor MN5 will be off and transistor MN6 will be on. As a result, voltages Vg and Vb will be about equal to Vpad (i.e., Vg and Vb will be negative). Transistors MN5 and MN6 therefore ensure that transistor MN4 will be off and will not conduct current during normal operation, regardless of the polarity of the signal voltage that is being passed to pad 14.

Figure 8:
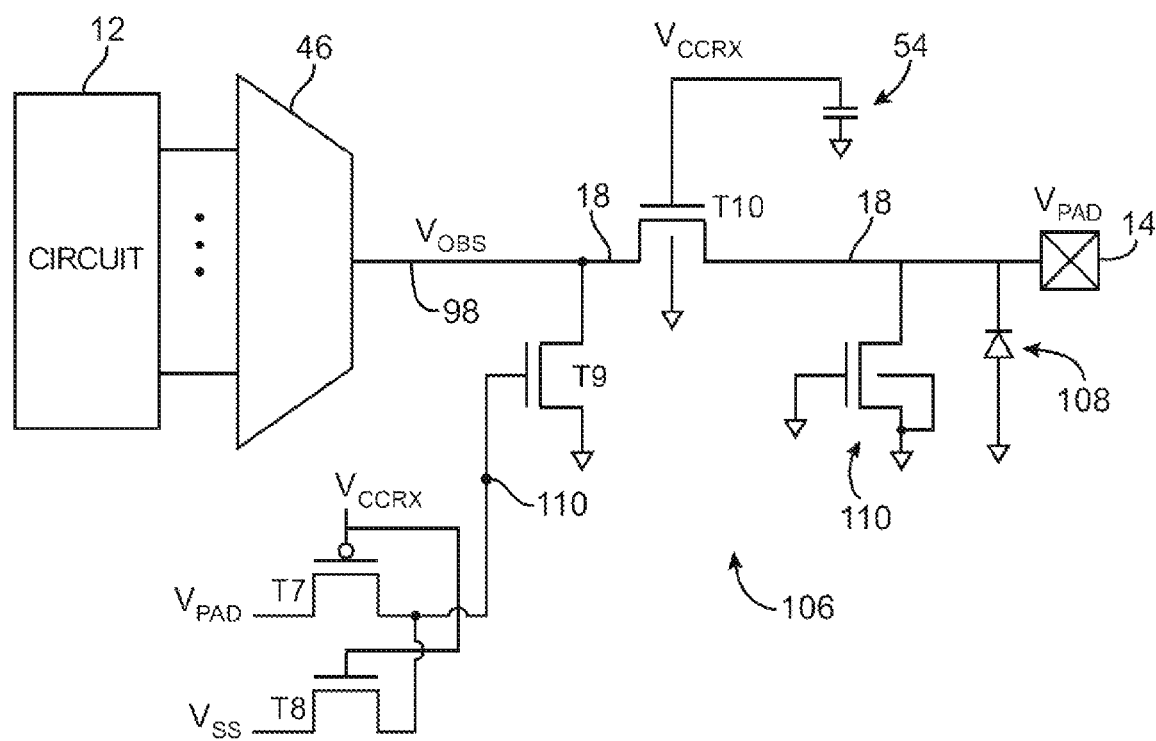
FIG. 8 is a circuit diagram of illustrative electrostatic discharge protection circuitry that may be used to protect circuitry that produces positive voltages in accordance with an embodiment of the present invention.

If desired, circuitry such as the electrostatic discharge protection circuitry 60 of FIG. 7 may be simplified to handle circuits that produce positive signal voltages Vobs. This type of arrangement is shown in FIG. 8. As shown in FIG. 8, electrostatic discharge protection circuitry 106 may be provided with a diode 108 that turns on to discharge current and voltage during negative voltage electrostatic discharge events. Transistor 110 may break down during positive voltage electrostatic discharge events as described in connection with FIG. 2. Diode 108 and transistor 110 therefore work together to provide protection from both positive and negative voltages during electrostatic discharge events.

Additional electrostatic discharge protection may be provided using a voltage blocking circuit such as a voltage blocking circuit formed from voltage blocking transistor T10. As described in connection with FIG. 6, during normal operation the gate of transistor T10 may be powered with a positive voltage Vccrx (e.g., 2.5 volts) that is elevated with respect to the core logic power supply level Vcc (e.g., 1.0 volts) that is used by core logic on the integrated circuit. Due to parasitic capacitive loading on the gate of transistor T10 (shown schematically as capacitance 54 in FIG. 8), the voltage on the gate of transistor T10 does not tend to track the voltage on Vpad during electrostatic discharge events, thereby isolating output 98, multiplexer circuit 46, and circuit 12 from electrostatic discharge voltages.

Transistors T7, T8, and T9 or other suitable circuitry may be used as pull-down circuitry for output 98. Transistor T9 may be used to help maintain Vobs at a safe voltage during electrostatic discharge events. During normal operation, voltage Vccrx is at 2.5 volts (as an example), so transistor T7 is off and transistor T8 is on. In this situation, transistor T9 is off. The voltage Vobs on output 98 may be passed to pad 14 via transistor T10 and path 18. During a positive voltage electrostatic discharge event in which the integrated circuit containing circuit 12 is powered off, the voltage Vccrx will be about 0 volts. Transistor T8 will therefore be off. When the voltage Vpad rises above the threshold voltage Vt of transistor T7, transistor T7 will turn on. With transistor T8 off and transistor T7 on, the voltage at node 110 will be equal to Vpad and transistor T9 will be turned on. While transistor T10 is isolating output 98 and circuit 12 from the positive electrostatic discharge voltage on pin 14, transistor T9 helps hold voltage Vobs at ground, thereby further protecting multiplexer 46 and circuit 12 from damage due to the positive electrostatic discharge voltage.

The foregoing is merely illustrative of the principles of this invention and various modifications can be made by those skilled in the art without departing from the scope and spirit of the invention.

What is claimed is:

1. An electrostatic discharge protection circuit, comprising:
   a blocking transistor coupled between an internal circuit and a pin that has a gate, wherein an integrated circuit comprises the internal circuit and the pin and wherein, during normal operation of the integrated circuit, the internal circuit is powered using a power supply voltage;
   a conductive line operable to convey an elevated power supply voltage from a power supply terminal to the gate during normal operation of the integrated circuit, wherein the elevated power supply voltage has a magnitude larger than the power supply voltage, wherein the gate is loaded by a capacitance when the integrated circuit is unpowered and the blocking transistor is turned off, wherein the blocking transistor remains off when electrostatic discharge voltages are applied to the pin, and wherein the blocking transistor is operable to isolate the internal circuit from the electrostatic discharge voltages on the pin.

2. The electrostatic discharge protection circuit defined in claim 1, wherein the internal circuit comprises a multiplexer having a plurality of inputs and an output and wherein the voltage blocking transistor has a terminal coupled to the output.

3. The electrostatic discharge protection circuit defined in claim 1, wherein the internal circuit comprises an output to which the voltage blocking transistor is coupled, the electrostatic discharge protection circuit further comprising pull down circuitry that is coupled to the output.

4. The electrostatic discharge protection circuit defined in claim 1 wherein the internal circuit is operable to produce voltages that range from ground to a positive voltage during normal operation and wherein the electrostatic discharge protection circuit further comprises:
   at least one diode connected between ground and the pin that discharges negative electrostatic discharge voltages.

5. The electrostatic discharge protection circuit defined in claim 4 further comprising a transistor connected between the pin and ground operable to break down at a breakdown voltage to discharge positive electrostatic discharge voltages.

6. An electrostatic discharge protection circuit to protect a circuit on an integrated circuit from electrostatic discharge voltages on a pin of the integrated circuit, comprising:
   a voltage blocking transistor connected between the circuit and the pin that has a gate connected to a power supply terminal, wherein the circuit comprises an output to which the voltage blocking transistor is connected, the electrostatic discharge protection circuit further comprising pull down circuitry that is connected to the output, wherein the voltage blocking transistor has a body terminal and wherein the pull down circuitry comprises a first transistor that is coupled between the output and ground and a second transistor that is coupled between the body terminal and ground.

7. The electrostatic discharge protection circuit defined in claim 6 further comprising a control circuit that contains at least two transistors and that supplies control signals to the first and second transistors.

8. The electrostatic discharge protection circuit defined in claim 6 further comprising at least two diodes connected in series between ground and the pin.

9. The electrostatic discharge protection circuit defined in claim 8 wherein the circuit comprises a multiplexer having a plurality of inputs and wherein the voltage blocking transistor has a terminal connected to the output.

10. The electrostatic discharge protection circuit defined in claim 8 further comprising a transistor connected between the pin and ground, wherein the transistor that is connected between the pin and ground breaks down when positive electrostatic discharge voltages are presented to the pin.

11. The electrostatic discharge protection circuit defined in claim 10 wherein the transistor that is connected between the pin and ground comprises a gate terminal and a body terminal, and wherein the electrostatic discharge protection circuit further comprises a pull down circuit connected to the gate terminal and the body terminal of the transistor that is connected between the pin and ground.

12. The electrostatic discharge protection circuit defined in claim 11 wherein the pull down circuit that is connected to the gate terminal and the body terminal of the transistor that is connected between the pin and ground comprises at least two transistors.

13. An integrated circuit comprising:
   a circuit operable to produce signals having positive and negative voltages during normal operation;
   a multiplexer having a plurality of pass transistors, a plurality of inputs operable to receive the signals from the circuit, and an output to which a selected one of the received signals is routed by a selected one of the plurality of pass transistors;
   a pin;
   a path between the output and the pin;
   a transistor interposed in the path; and
   pull down circuitry operable to pull the output to ground when electrostatic discharge voltages are supplied to the pin during electrostatic discharge events, wherein the transistor comprises a body terminal and wherein the pull down circuitry comprises circuitry operable to pull the body terminal to ground when electrostatic discharge voltages are supplied to the pin during electrostatic discharge events.

14. The integrated circuit defined in claim 13 further comprising two diodes coupled in series between ground and the pin.

15. The integrated circuit defined in claim 14 wherein a gate of the transistor that is interposed in the path is coupled to a power supply terminal, the integrated circuit further comprising a transistor that is connected between the pin and ground operable to break down to discharge positive electrostatic discharge voltages applied to the pin during electrostatic discharge events.

16. A method, comprising:
   during normal operation of an integrated circuit, routing signals to an internal circuit on the integrated circuit;
   with a transistor that has a gate coupled to an elevated positive power supply voltage terminal, conveying the signals to a pin of the integrated circuit during normal operation of the integrated circuit, wherein the elevated positive power supply voltage terminal provides an elevated positive power supply voltage that is higher than a positive power supply voltage that is provided to the internal circuit during normal operation; and
   when the integrated circuit is unpowered and electrostatic discharge voltages are applied to the pin during an electrostatic discharge event, preventing the electrostatic discharge voltages from reaching the path with the transistor wherein the preventing includes loading the gate of the transistor with a capacitance, wherein the transis tor remains off when the electrostatic discharge voltages are applied to the pin.

17. The method defined in claim 16 further comprising:
when the integrated circuit is unpowered and the electrostatic discharge voltages are applied to the pin during an electrostatic discharge event, discharging the electrostatic discharge voltages with an additional transistor that is coupled between the pin and ground.

18. The method defined in claim 17 further comprising:
when the integrated circuit is unpowered and the electrostatic discharge voltages are applied to the pin during an electrostatic discharge event, discharging the electrostatic discharge voltages with at least one diode that is coupled between the pin and ground.

\* \* \* \* \*